(12) United States Patent
Santos

(10) Patent No.: US 11,690,480 B2
(45) Date of Patent: Jul. 4, 2023

(54) GRINDER FOR PLANT SUBSTANCES

(71) Applicant: Rodrigo Escorcio Santos, Rockville, MD (US)

(72) Inventor: Rodrigo Escorcio Santos, Rockville, MD (US)

(*) Notice: Subject to any disclaimer, the term of this patent is extended or adjusted under 35 U.S.C. 154(b) by 0 days.

(21) Appl. No.: 17/564,311

(22) Filed: Dec. 29, 2021

(65) Prior Publication Data

US 2022/0202243 A1 Jun. 30, 2022

Related U.S. Application Data

(60) Provisional application No. 63/132,092, filed on Dec. 30, 2020.

(51) Int. Cl.
*A47J 42/20* (2006.01)
*A47J 42/14* (2006.01)
*A47J 42/40* (2006.01)

(52) U.S. Cl.
CPC .............. *A47J 42/20* (2013.01); *A47J 42/14* (2013.01); *A47J 42/40* (2013.01)

(58) Field of Classification Search
CPC .. A47J 42/20; A47J 42/14; A47J 42/40; A47J 43/25; A47J 43/255
See application file for complete search history.

(56) References Cited

U.S. PATENT DOCUMENTS 3,581,790 A * 6/1971 Conte .................... A47J 43/255
241/88.1

6,508,424 B1 * 1/2003 Marshall ............... A61J 7/0007
241/DIG. 27
2022/0071448 A1 * 3/2022 Hansen .................... A47J 42/24

FOREIGN PATENT DOCUMENTS

| BE | 894584 A | * | 1/1983 | .............. A47J 19/04 |
| CN | 102133029 A | * | 7/2011 | |
| DE | 202008011495 U1 | * | 3/2009 | .............. A47J 43/25 |
| FR | 1253288 A | * | 12/1959 | |
| WO | WO1988002613 A1 | * | 4/1988 | |

OTHER PUBLICATIONS

English translate (CN102133029A), retrieved date Dec. 25, 2022.*
English translate (DE202008011495U1), retrieved date Dec. 25, 2022.*
English translate (FR1253288A), retrieved date Feb. 21, 2023.*
English translate (BE894584A), retrieved date Feb. 21, 2023.*

* cited by examiner

*Primary Examiner* — Matthew Katcoff
*Assistant Examiner* — Mohammed S. Alawadi
(74) *Attorney, Agent, or Firm* — Edell, Shapiro & Finnan, LLC

(57) ABSTRACT

A grinder for plant substances includes a first surface and an opposing second surface that is separated from the first surface by a first longitudinal gap so that the first surface and the second surface define a receptacle within which a plant substance may be received. The second surface includes holes through which ground pieces of the plant substance may pass and at least one of the first surface and the second surface includes bumps that extend into, but not across, the receptacle. The bumps encourage rolling friction between the plant substance and the bumps so that the plant substance is ground into pieces small enough to pass through the holes.

20 Claims, 6 Drawing Sheets

GRINDER FOR PLANT SUBSTANCES

CROSS-REFERENCE TO RELATED APPLICATIONS

This application claims priority under 35 U.S.C. § 119(e) to U.S. Provisional Patent Application Ser. No. 63/132,092, entitled "Grinder," filed Dec. 30, 2020, the disclosure of which is incorporated herein by reference in its entirety for all purposes.

FIELD OF THE INVENTION

The present invention is directed toward a grinder for plant substances, such as herbs or combustible substances.

BACKGROUND OF THE INVENTION

Often, plant substances, such as herbs or combustible substances, are ground into small pieces prior to use (e.g., for cooking, flavoring, and/or or to produce vapors for inhalation). In the specific case of vaporization (or other such combustion techniques), plant substances may be ground to promote thorough and even combustion. Thus, consumers often use grinders to process plant substances (i.e., chop, grind, or otherwise reduce in size) prior to use (e.g., prior to combusting a plant substance for inhalation).

Many grinders, regardless of their specific intended use, include teeth that tear or grind a plant substance when teeth slide along each other. More specifically, the teeth included in grinders for plant substances typically extend between opposing surfaces, with some teeth extending from one surface into contact with the other and vice versa. Additionally, the teeth are often arranged to slide by each other when one surface is rotated with respect to the other surface. That is, during such a rotation, the teeth typically slide along each (at their radial edges) and/or are only separated by very small gaps (between their radial edges), such as gaps of only a few millimeters ("mm").

The small or nonexistent gaps cause the teeth to grind and/or tear a plant substance when the teeth are rotated with respect to each other, but the small or nonexistent gaps also cause plant substance to stick on the teeth. This may waste plant substance and/or cause the teether to lock up (e.g., after 1-2 mm of ground plant buildup occurs). Wasting substances may be particularly problematic when the plant substance in the grinder is expensive and/or only available in limited quantities (e.g., due to medical dosing). Additionally, the above-described teeth may generate a large amount of sliding friction, creating resistance forces that require a user to exert a large amount of force when grinding a plant substance. This resistance only increases as more plant substance accumulates on the teeth.

SUMMARY OF THE INVENTION

A grinder for plant substances, especially combustible plant substances, is presented herein. According to at least one embodiment, the grinder includes a first surface and an opposing second surface that is separated from the first surface by a first longitudinal gap. Thus, the first surface and the second surface define a receptacle within which a plant substance may be received. The second surface includes holes through which ground pieces of the plant substance may pass and at least one of the first surface and the second surface includes bumps that extend into, but not across, the receptacle. The bumps encourage rolling friction between the plant substance and the bumps so that the plant substance is ground into pieces small enough to pass through the holes. Among other advantages, the bumps reduce or eliminate resistance forces, such as those generated by teeth sliding by each other, which require a user to exert a large amount of force when grinding a plant substance. Moreover, the bumps retain little to no plant substance thereon during the grinding process. That is, the bumps reduce or eliminate build-up. This reduces the amount of material that is wasted and helps prevent rotational resistance from increasing over time.

In at least some embodiments, the bumps are only included on the first surface. In other embodiments, the bumps are only included on the second surface. Still further, in some embodiments, the bumps are first bumps included on the first surface and grinder further comprises second bumps included on the second surface. In any case, some or all of the bumps included in the grinder may be hemispherical knobs.

When the grinder included two surfaces with bumps, apexes of the second bumps may be separated from apexes of the first bumps by a second longitudinal gap that is smaller than the first longitudinal gap. Alternatively, if the grinder included one surface with bumps, apexes of the bumps may be separated from an opposing surface by a second longitudinal gap that is smaller than the first longitudinal gap. In either case, in at least some instances, the second longitudinal gap may span a second longitudinal distance that is equal to or less than approximately 50% of a first longitudinal distance of the first longitudinal gap. For example, the second longitudinal distance may be at least approximately 3 mm (in which case, the first longitudinal distance would be at least approximately 6 mm). As is described in further detail below, the gap may prevent the grinder from resisting rotational movement and/or prevent binding.

In some embodiments, the bumps are patterned between the holes. Additionally or alternatively, the bumps may be patterned symmetrically around or across the at least one of the first surface and the second surface. Still further, the bumps may be patterned linearly across the least one of the first surface and the second surface. Different patterns may provide different levels of reduced friction and/or different grinding effectiveness.

In some aspects, the first surface is a bottom surface of a top grinding section and the second surface is a top surface of a bottom grinding section, the top grinding section being removably coupleable to the bottom grinding section. In some of these embodiments, the grinder further includes one or more sieves positioned to receive the pieces of the plant substance that are small enough to pass through the holes. The one or more sieves can further filter the plant substance based on size. Additionally or alternatively, the grinder may include a catcher positioned to receive portions of the plant substance that pass through the holes and/or the one or more sieves. The catcher and sieves may allow the grinder to capture different granule sizes in different portions so that, for example, a user can retrieve plant pieces of different sizes and/or powder-like plant substance from the grinder.

According to some embodiments, a grinder for plant substances includes a top grinding section, a catcher, and a bottom grinding section. The bottom grinding section is removably coupleable to the top grinding section and removably coupleable to the catcher. Thus, when the grinder is assembled the bottom grinding section will be positioned between the top grinding section and the catcher, and the top grinding section and the bottom grinding section will define a receptacle within which a plant substance may be received.

At least one of the top grinding section and the bottom grinding section includes bumps that extend into, but not across, the receptacle. The bumps encouraging rolling friction between the plant substance and the bumps so that the plant substance is ground into pieces. Additionally, the bottom grinding section includes holes through which the pieces of the plant substance may pass to the catcher. This grinder may also include any of the features, and realize any of the advantages of, the grinder embodiments discussed above.

Other systems, apparatuses, methods, features and advantages will be, or will become, apparent to one with skill in the art upon examination of the following figures and detailed description. All such additional systems, methods, features and advantages are included within this description, are within the scope of the claimed subject matter

BRIEF DESCRIPTION OF THE DRAWINGS

Like reference numerals have been used to identify like elements throughout this disclosure.

DETAILED DESCRIPTION

Present is a grinder that eliminates the teeth used by traditional grinders and replaces these teeth with rounded (e.g. hemispherical) bumps or knobs. That is, the grinder presented herein includes two opposing surfaces, at least one of which includes bumps or knobs, such as hemispherical bumps. The bumps on opposing surfaces do not come into contact with each other, nor do the bumps come into contact with an opposing surfaces of the grinder. Thus, there is a longitudinal gap between apexes of the bumps and apexes of opposing bumps and/or opposing surfaces. These bumps encourage rolling friction between a plant substance and the bumps, thereby drastically lowering the resistance generated during grinding.

The bumps also encourage friction between portions of the plant substance so that friction between different surfaces or portions of the plant substance rubbing together causes grinding of the plant substance. However, importantly, since the bumps do not slide by or along other bumps or surfaces (because there is a longitudinal gap above an apex of each bump), the grinder presented herein does not lock up or bind when ground plant substance builds-up in the grinder. The product presented herein also minimizes waste by reducing or eliminating build-up that occurs with traditional teeth.

Figure 1:
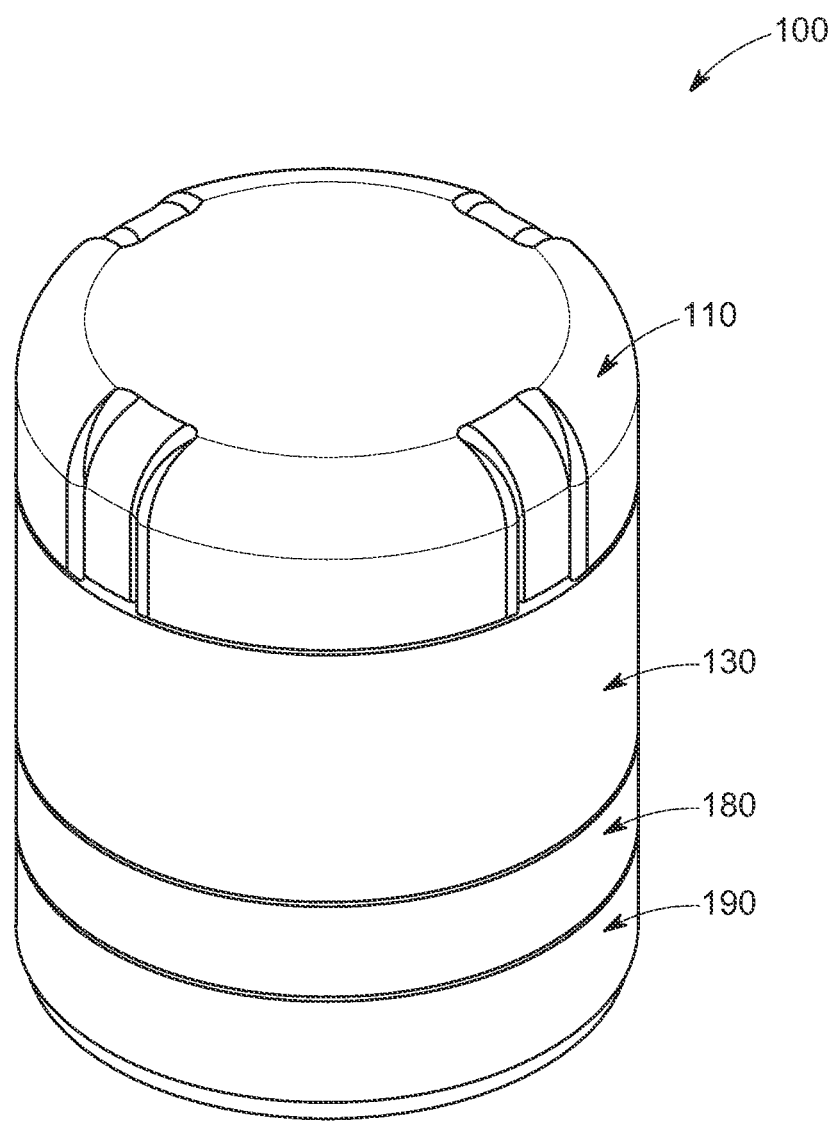
FIG. 1 illustrates a front perspective view of a grinder formed in accordance with an example embodiment of the present invention.
Figure 2:
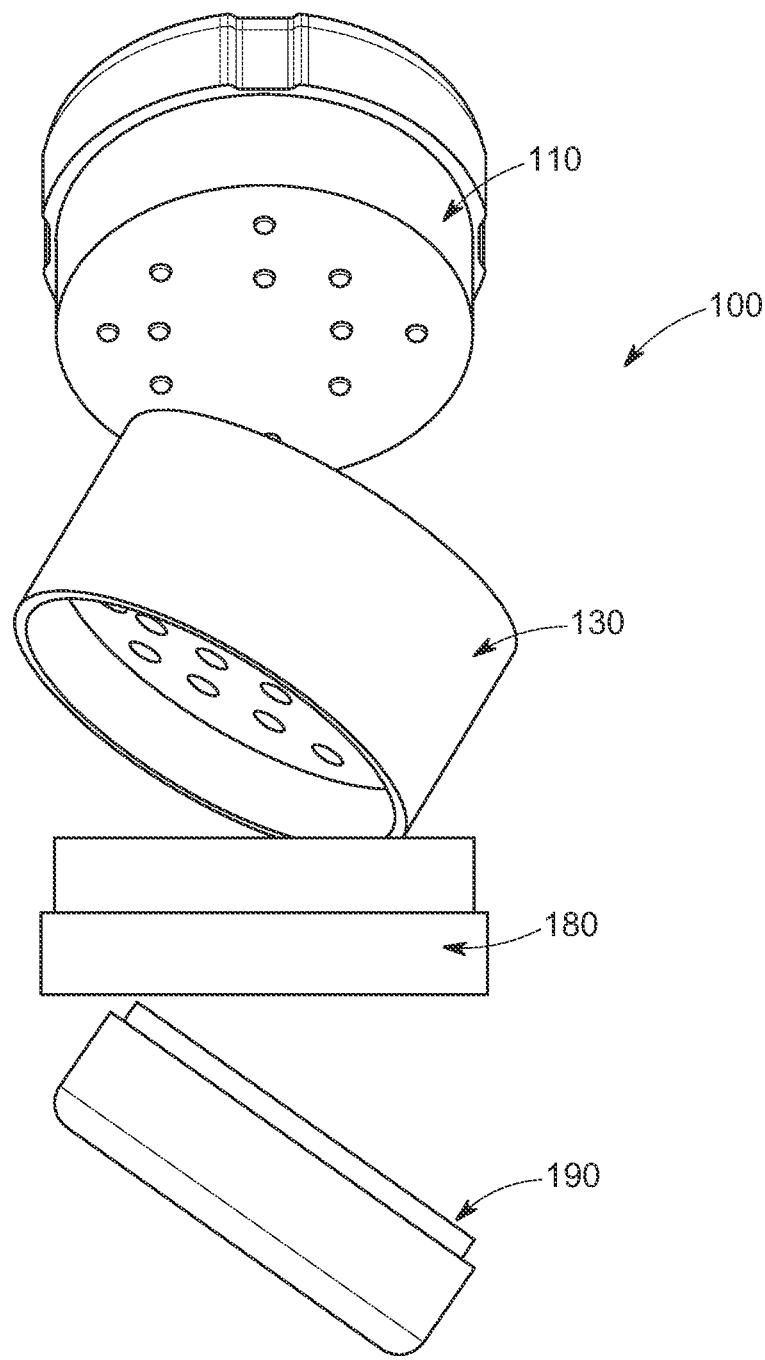
FIG. 2 illustrates a partially exploded view of the grinder of FIG. 1, showing a sieve, a catcher, a top grinding section, and a bottom grinding section disconnected from each other.

Now turning to FIGS. 1 and 2 for a description of an example embodiment of a grinder 100 formed in accordance with the techniques presented herein. As is shown, in one form, the grinder 100 presented herein includes a top grinding section 110, a bottom grinding section 130, a sieve 180, and a catcher 190. The top grinding section 110 is removably coupled to a first side (e.g., a top side) of the bottom grinding section 130 while a second side (e.g., a bottom side) of the bottom grinding section 130 is removably coupleable to a first side (e.g., a top side) of the sieve 180. Thus, the bottom grinding section 130 may be sandwiched between the top grinding section 110 and the sieve 180. Then, the catcher 190 may be removably coupled to a second side (e.g., a bottom side) of the sieve 180 to form a complete unit. Each removably coupling may be achieved in any manner. For example, the sieve 180 may be removably coupled to both the bottom grinding section 130 and the catcher 190 via threads while the top grinding section 110 can be removably coupled to the bottom grinding section 130 via a friction fit and/or magnetic coupling (an example of which is described in further detail below).

As is shown, when assembled, the complete unit may be substantially cylindrical, with sides of the top grinding section 110, bottom grinding section 130, sieve 180, and catcher 190 forming sidewalls that are substantially continuous, except for grips defined by the top grinding section 110. However, this is merely an example, and other embodiments may have any desirable shape or shapes. Moreover, other embodiments may have any number of sieves 180 (e.g., zero, one, two, or more) to provide different levels of filtering between the bottom grinding section 130 and the catcher 190—to capture different sized pieces of ground plant substance in different locations. Still further, some embodiments needs not include the catcher 190 and/or sieve 180 as separate parts and any combination of these parts, or the functions thereof, could be built into the bottom grinding section 130.

Figure 3:
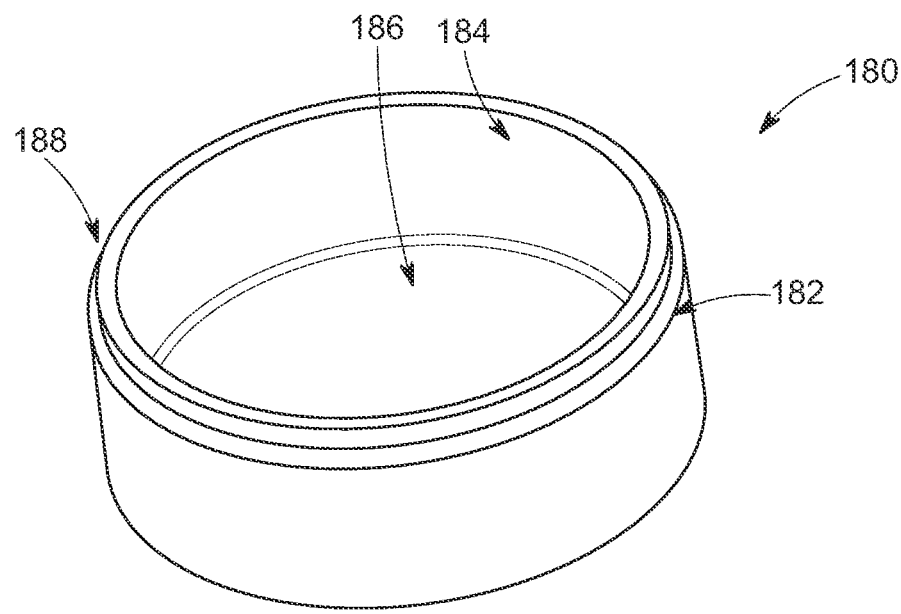
FIG. 3 illustrates a top perspective view of the sieve included in the grinder of FIG. 1, according to an example embodiment.

Now turning to FIG. 3, the sieve 180 may be or act as a filter to regulate the size of ground plant substance that can pass into the catcher 190. In the depicted embodiment, the sieve 180 includes a sidewall 182 that defines a central opening 184 and a filter 186 spans the central opening 184, between the interior edges of the sidewall 182. A top of the sidewall 182 defines a seat 188 that can receive the bottom grinding section 130 and removably couple the sieve 180 to the bottom grinding section 130. Although not shown, a bottom of sidewall 182 includes similar features to couple the sieve 180 to the catcher 190. Moreover, although not shown, the sidewall 182 can include features, such as threads, to removably couple the sieve 180 to the bottom grinding section 130 and/or the catcher 190

Figure 4:
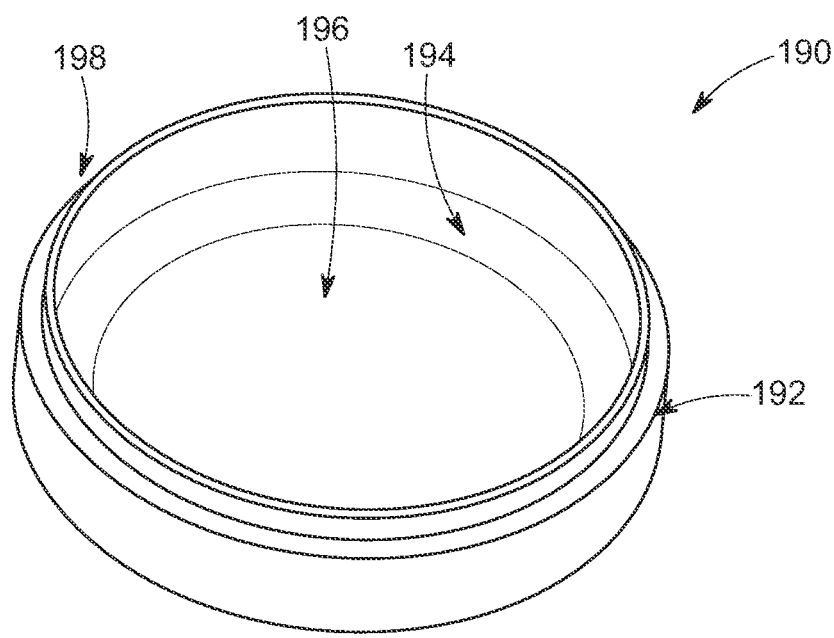
FIG. 4 illustrates a top perspective view of the catcher included in the grinder of FIG. 1, according to an example embodiment.

FIG. 4 illustrates the catcher 190 included in the depicted embodiment. As is shown, the catcher 190 includes a sidewall 192 and a bottom 194 that, together, define a receptacle 196 within which pieces or granules of ground plant substance can be collected. For example, in some embodiments, one or more sieves 180 may be configured to only allow fine granules of a ground plant substance to pass to the catcher 190 and, thus, the bottom 194 will hold a powdered version of the ground plant substance (e.g., crystals and/or trichomes) after a grinding operation. A top of the sidewall 192 defines a seat 198 that can receive the sieve 180 (or the lowermost sieve 180 in a grinder that includes multiple sieves) and removably couple the catcher 190 to the sieve 180. Although not shown, the sidewall 192 can include features, such as threads, to removably couple the catcher to one or more sieves 180, the bottom grinding section 130, or any other component.

Now turning to FIGS. 5-8, regardless of the number, shape, size, and configuration of sieve 180 and/or catcher 190, the top grinding section 110 and the bottom grinding section 130 collectively form a chamber or receptacle 150 (see FIG. 8) in which a plant substance can be received. Critically, at least one of top grinding section 110 and bottom grinding section 130 includes a surface with bumps that extend into the receptacle 150. However, for simplicity and brevity, the Figures illustrate an embodiment where the top grinding section 110 has a first surface 120 (e.g., a bottom surface) with a plurality of second bumps 122 and the bottom grinding section 130 has a second surface 140 with a plurality of second bumps 142. Bumps 122 and 142 each extend into the receptacle 150 but do not extend through the receptacle 150. Thus, the bumps 122 do not create frictional resistance for bumps 142 and vice versa.

Figure 5:
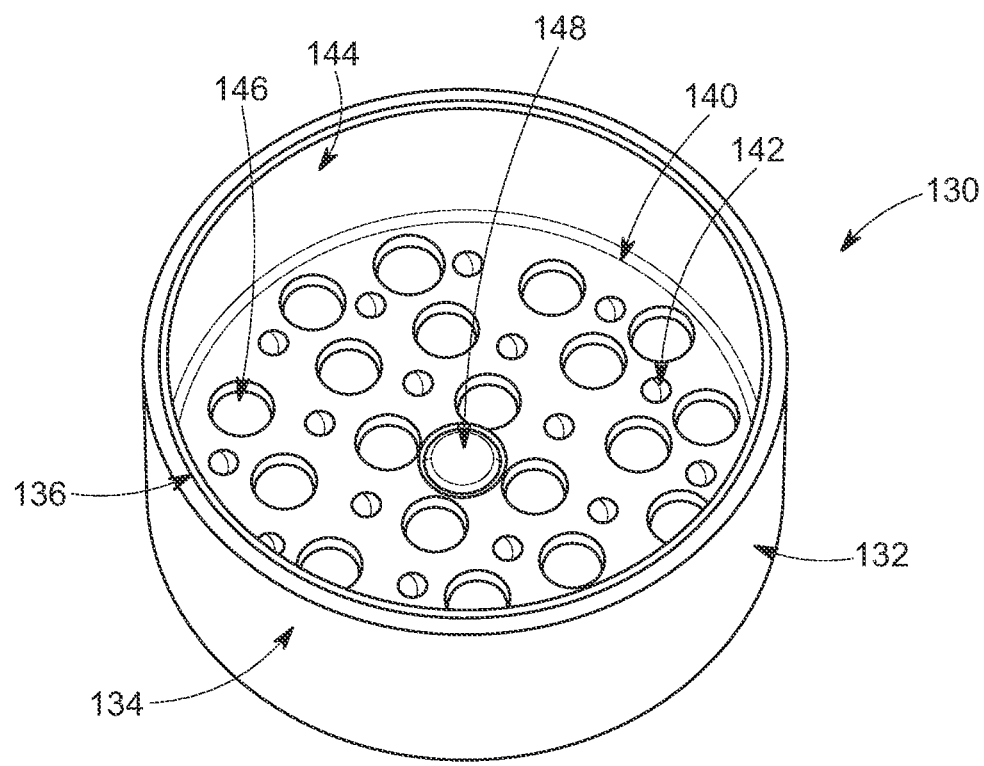
FIG. 5 illustrates a top perspective view of the bottom grinding section included in the grinder of FIG. 1, according to an example embodiment.

As is shown in FIG. 5, in the depicted embodiment, the bottom grinding section 130 includes an annular sidewall 132 with an outer surface 134, a top edge 136, and an inner surface 144. A planar surface 140 extends from the inner surface 144 of the annular sidewall 132, adjacent or proximate to a bottom of the annular sidewall 132. Thus, the second surface 140 and the outer surface 134 define an open-top cavity within which plant substances can be received. As is shown, the second surface 140 of the bottom grinding section 130 includes holes 146 sized to allow pieces of a ground plant substance to pass through the second surface 140, for example, towards the catcher 190. However, in at least some embodiments, the sieve 180 is disposed between the bottom grinding section 130 and the catcher 190 and, thus, can further filter or sort ground plant substances based on size prior to the ground plant substance reaching the catcher 190.

As mentioned, the second surface 140 also includes bumps 142 (i.e. knobs 142). The bumps 142 extend longitudinally from the second surface 140, into the open-top cavity of the bottom grinding section 130. In the depicted embodiment, the bumps 142 are hemispherical. But, in other embodiments, the bumps 142 may have any desired shape, provided that a top surface of the bumps is rounded and/or encourages rolling friction. Alternatively, if the top grinding section 110 includes bumps 122, the bottom grinding section 130 might not include bumps 142.

In the depicted embodiment, the holes 146 are patterned linearly across the second surface 140. Specifically, six parallel lines of holes 146 extend across the second surface 140, from one side to the other (without each line extending through a center of the circular second surface 140) and the holes 146 are evenly spaced across these lines. Meanwhile, the bumps 142 are evenly spaced across parallel lines disposed between the lines of holes 146. This creates an arrangement where the holes 146 and bumps 142 are symmetrical across the second surface 140 when viewed with respect to a diameter of the second surface 140 that extends parallel to the lines of holes 146 and bumps 142 the second surface 140. That is, one half of the second surface 140 mirrors or matches another half of the second surface 140.

However, the depicted arrangement of holes 146 and bumps 142 is just one arrangement and, in other embodiments, bumps 142 and/or holes 146 may be patterned or arranged in any other manner. Moreover, the pattern of bumps 142 and the pattern of holes 146 need not match. For example, bumps 142 could be patterned around a center of the circular second surface 140 so that the bumps are symmetrical around the second surface 140. Alternatively, different numbers of bumps may be positioned on different radial lines extending from a center of the second surface 140. Meanwhile, holes 146 can be positioned between bumps 142 in any desirable arrangement.

Still referring to FIG. 5, in the depicted embodiment, the second surface 140 includes a magnet 148. The magnet 148 is centered on the second surface 140 and extends above the bumps 142. Thus, when the magnet 148 contacts a corresponding magnet included on the top grinding section 110, a height of magnet 148 can at least partially define a receptacle 150 that allows the bumps 142 to extend into the receptacle 150 without extending through the receptacle 150. As an example, the bumps 142 may have a longitudinal dimension (i.e., height) of approximately 1.5 mm and magnet 148 may have a longitudinal dimension of approximately 3 mm. Thus, if a corresponding magnet (e.g., magnet 128 of FIG. 6) included in the top grinding section 110 also has a longitudinal dimension of approximately 3 mm, the receptacle 150 will have a longitudinal dimension of approximately 6 mm and the bumps 142 will extend across only 1.5 mm of this 6 mm span.

However, to be clear, magnet 148 is only an example of a feature that can removably couple the top grinding section 110 to the bottom grinding section 130. Likewise, magnet 148 is only an example of a feature that can define a longitudinal dimension of the receptacle 150. In other embodiments, the bottom grinding section 130 and/or top grinding section 110 can include any desirable feature or features to achieve these aspects. For example, the bottom grinding section 130 and/or top grinding section 110 can include any number of components that allow removable coupling, in addition to or in lieu of magnets, arranged in any arrangement. Additionally or alternatively, walls of grinding sections 110 and 130 (e.g., sidewall 132) can be configured to engage each other in a manner that defines the longitudinal dimension of the receptacle 150 and/or removably couples the grinding sections 110 and 130 together (i.e., regardless of magnets or other such couplers included in these sections).

Figure 6:
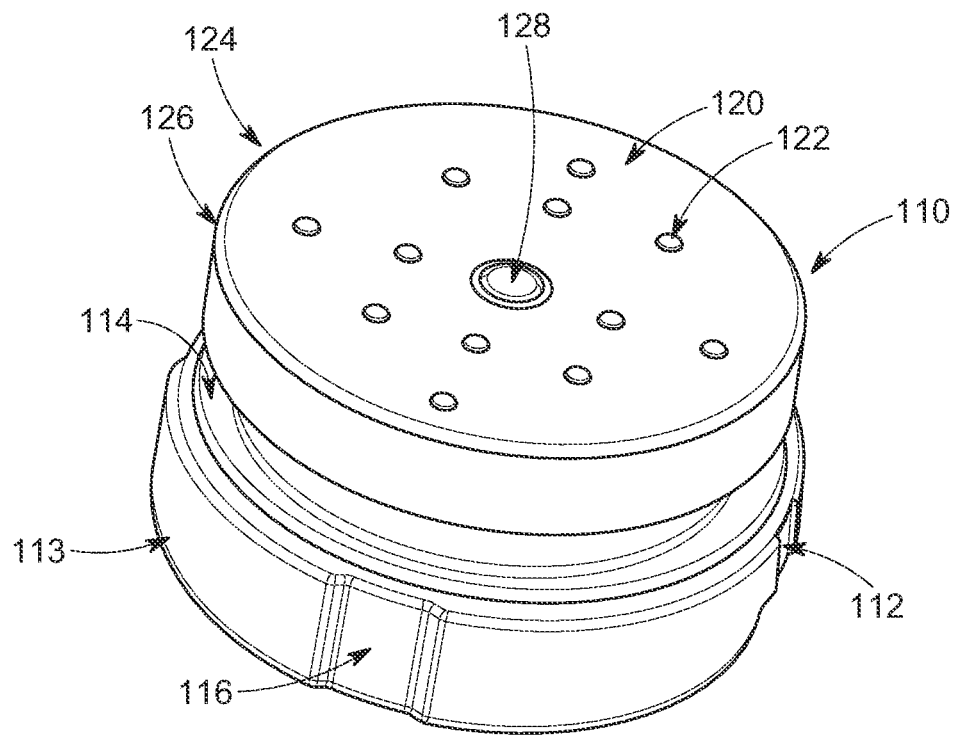
FIG. 6 illustrates a bottom perspective view of the top grinding section included in the grinder of FIG. 1, according to an example embodiment.

Now turning to FIG. 6, in the depicted embodiment, the top grinding section 110 includes a grip section 112 and a grinding section 124. The grip section 112 has a top 113 and a sidewall 116 that extends away from the top 113, towards the grinding section 124. As is shown, in at least some embodiments, the sidewall 116 of the grip section 112 may have grooves and an ergonomic shape to enable easy gripping and rotation.

Meanwhile, the grinding section 124 has a bottom planar surface 120 (i.e., first surface 120) and a sidewall 126 that extends away from the first surface 120, towards the grip section 112. As can be seen, the sidewall 126 is positioned substantially within the dimensions of the sidewall 116 so that a shoulder 114 is defined between the grinding section 124 and the grip section 112. In the depicted embodiment, the sidewall 116 is sized to fit within the annular sidewall 132 of the bottom grinding section 130 while sidewall 116 is larger than the annular sidewall 132. Thus, shoulder 114 may define a longitudinal distance that the grinding section 124 extends into the bottom grinding section 130. In turn, this can at least partially define a longitudinal distance of the receptacle 150 defined between the first surface 120 of the top grinding section 110 and the second surface 140 of the bottom grinding section 130. As is shown, in at least some embodiments, the shoulder 114 may include grooves (e.g., a track) that allow the grip section 112 to ride on and/or seal against a top edge 136 of the annular sidewall 132 of the bottom grinding section 130.

However, in other embodiments, the top grinding section 110 need not include a shoulder 114 and/or the grinding section 124 need not be sized to fit into the bottom grinding section 130. For example, sidewall 126 might be sized to mate with the top edge 136 of the annular sidewall 132 (of the bottom grinding section 130) so that the top grinding section 110 sits atop the bottom grinding section 130 (without entering the open-top cavity defined by the bottom grinding section 130). Alternatively, the sidewall 126 might be sized to enter the open-top cavity defined by the bottom grinding section 130, but the longitudinal dimension of the receptacle 150 defined between the top grinding section 110 and the bottom grinding section 130 might be defined entirely by other features included on the first surface 120 and/or second surface 140.

In the depicted embodiment, the first surface 120 includes bumps 122 (i.e. knobs 122). The knobs extend longitudinally from the first surface 120, away from the top grinding section 110. In the depicted embodiment, the bumps 122 are hemispherical. But, in other embodiments, the bumps 122 may have any desired shape, provided that a top surface of the bumps is rounded and/or encourages rolling friction. Alternatively, if the bottom grinding section 130 includes bumps 142, the top grinding section 110 might not include bumps 122.

In the depicted embodiment, the bumps 122 are included on radial lines that extend from a center of the first surface 120, patterned so that the lines alternate between including one bump or two bumps. This creates an arrangement where bumps 122 are symmetrical across the first surface 120 when viewed with respect to multiple diameters of the top grinding section 110. However, the depicted arrangement of bumps 122 is just one arrangement and, in other embodiments, bumps 122 may be patterned or arranged in any other manner. Moreover, the pattern of bumps 122 on the first surface 120 need not match a pattern of bumps 142 included on the second surface 140. Instead, any numbers of bumps 122 may be positioned in any desirable arrangement across and/or around first surface 120 and any numbers of bumps 142 may be positioned in any desirable arrangement across and/or around first surface 140, independent of the arrangement of bumps 122 on first surface 120. For example, bumps 122 could be patterned around a center of the circular first surface 120 so that the bumps 122 are symmetrical around the first surface 120 while bumps 142 are symmetrical across the second surface 140.

Still referring to FIG. 6, in the depicted embodiment, the first surface 120 includes a magnet 128 that is configured to mate with magnet 148 (of second surface 140). Thus, the magnet 128 is centered on the first surface 120 and extends above the bumps 122 so that, a height of magnet 128 can at least partially define a receptacle 150 and allow the bumps 122 to extend into the receptacle 150 without extending through the receptacle 150. As an example, the bumps 122 may have a longitudinal dimension (i.e., height) of approximately 1.5 mm and magnet 128 may have a longitudinal dimension of approximately 3 mm. Thus, if magnet 148 of second surface 140 also has a longitudinal dimension of approximately 3 mm, the receptacle 150 will have a longitudinal dimension of approximately 6 mm and the bumps 122 will extend across only 1.5 mm of this 6 mm span, either in alignment with or out of alignment with bumps 142.

To reiterate, magnets 128 and 148 are only an example of a feature that can removably couple the top grinding section 110 to the bottom grinding section 130 and/or define a longitudinal dimension of the receptacle 150. However, generally, features and/or structures that allow movement of one of the top grinding section 110 to the bottom grinding section 130 with respect to the other while providing a removable coupling therebetween, like magnets 128 and 148, may be advantageous. This is because such features may secure grinding sections 110 and 130 together during grinding operations, where a user must rotate one of grinding section 110 or 130 with respect to the other. In the depicted embodiment, the centered location of magnets 128 and 148 also defines a rotational axis for one of grinding section 110 or 130 to rotate with respect to the other. However, in other embodiments, engagement between sidewalls 126 and 132, or any other desirable feature, could also define a rotational axis for one of grinding section 110 or 130 to rotate with respect to the other.

Figure 7:
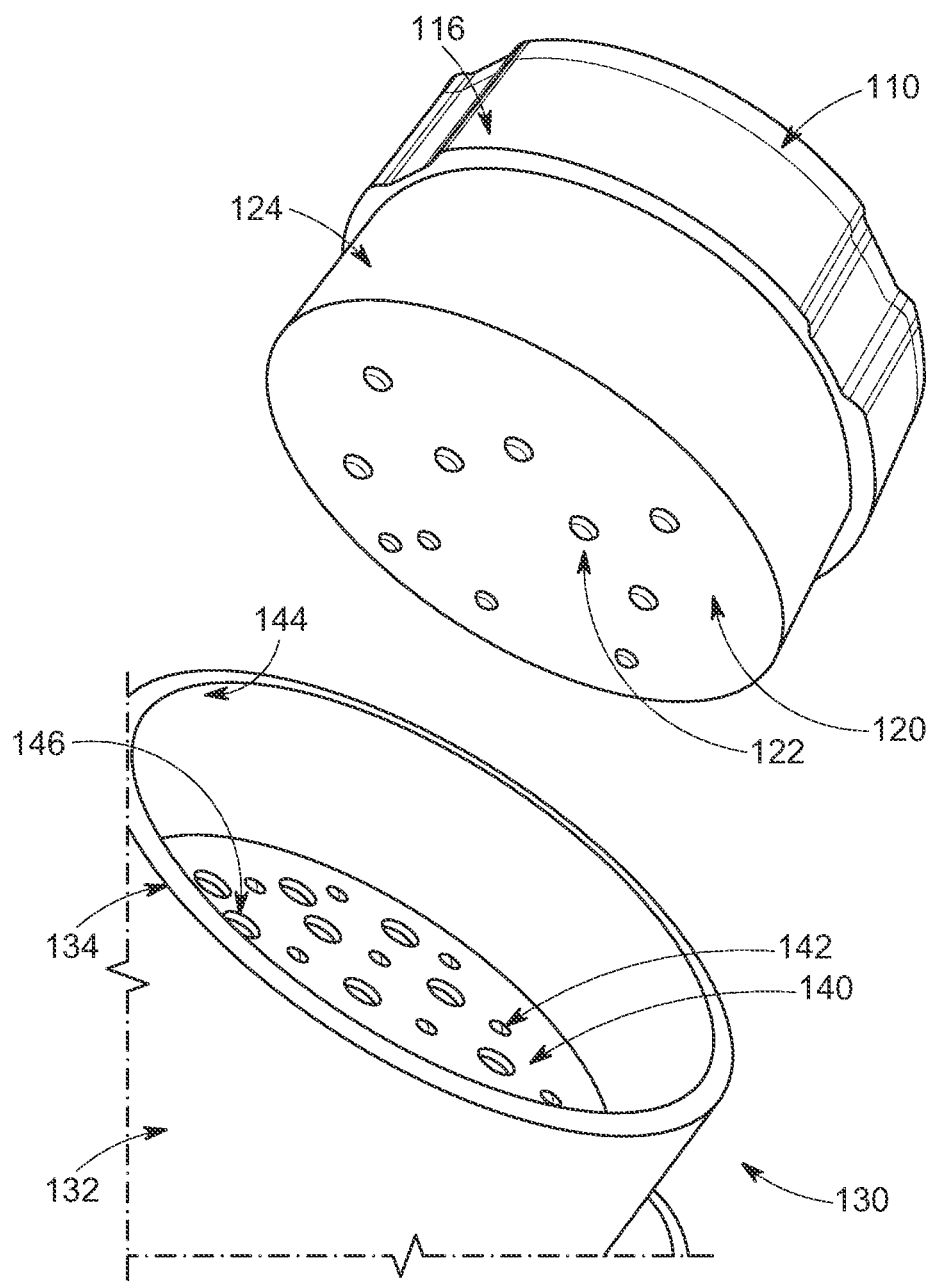
FIG. 7 illustrates a front perspective view of the top and bottom grinding sections included in the grinder of FIG. 1, according to an example embodiment.
Figure 8:
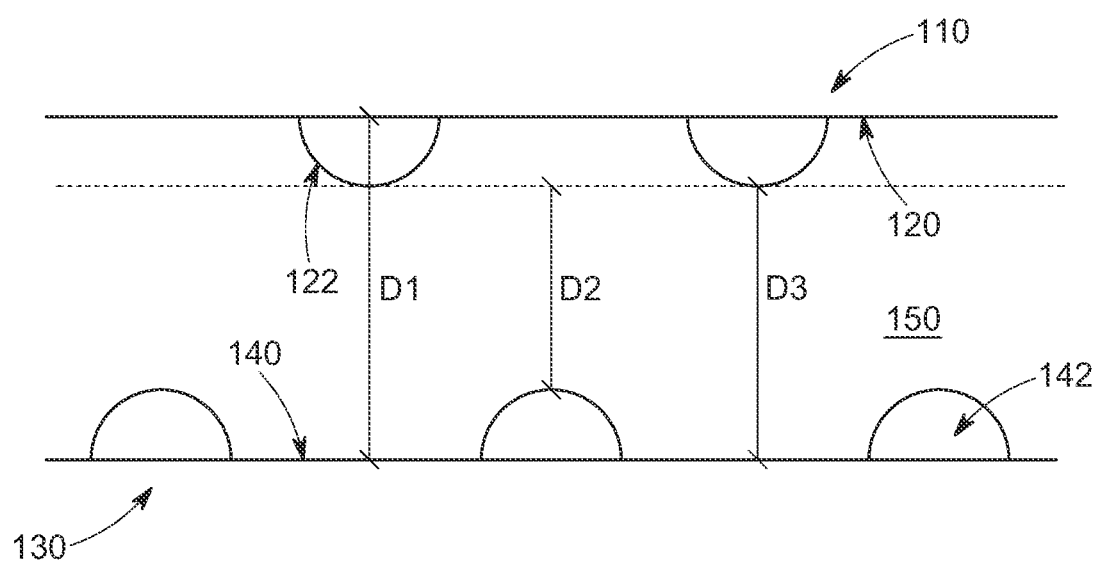
FIG. 8 illustrates a schematic, side sectional view of the top and bottom grinding sections included in the grinder of FIG. 1 while coupled together, according to an example embodiment.

Now turning to FIGS. 7 and 8, when the top grinding section 110 is installed in and/or coupled to the bottom grinding section 130, any bumps included on the first surface 120 or the second surface 140 extend into the receptacle 150. In the depicted embodiment, grinding sections 110 and 130 each include bumps—bumps 122 and 142, respectively— that project from a relatively flat/planar face 120 and 140, respectively, and thus, two sets of bumps extend into the receptacle 150. Moreover, in the depicted embodiment, planar faces 120 and 140 are configured to sit parallel to each other when the grinder 100 is assembled. Thus, apexes of bumps 122 and 142 extend towards each other when grinder sections 110 and 130 are coupled together. However, the apexes of bumps 122 and 142 do not contact each other. Instead, there is a longitudinal gap disposed therebetween.

More specifically, if one bump of bumps 122 and one bump of bumps 142 are disposed on one axis extending perpendicularly between the two opposing faces 120, 140 of the grinding sections 110 and 130, a gap will be present along that axis, between apexes of the two bumps. Such a gap is depicted schematically in FIG. 8 as having a longitudinal distance D2 that is smaller than the longitudinal distance D1 of the receptacle 150. Alternatively, if one bump of bumps 122 and one bump of bumps 142 are disposed on different axes extending perpendicularly between the two opposing faces 120, 140 of grinding sections 110 and 130, a gap will be present along that axis, between the apex of the bump and its opposing surface. Such a gap is depicted schematically in FIG. 8 as having a longitudinal distance D3 that is smaller than the longitudinal distance D1 of the receptacle 150. A gap with a longitudinal distance D3 may also be created when only one of face 120 or face 140 includes bumps (i.e., if bumps 122 or bumps 142 are not included in grinder 100).

In some embodiments, a gap disposed above an apex of a bump may be proportional to the overall gap size of the receptacle. For example, distance D2 and/or distance D3 may be equal to or less than approximately 50% of the overall longitudinal distance D1 of the receptacle 150. Alternatively, distance D2 and/or distance D3 may be equal to or less than approximately 60%, approximately 75%, approximately 85%, or approximately 90% of the overall longitudinal distance D1 of the receptacle 150. As a specific example, D2 may be approximately 3 mm, D1 may be approximately 6 mm, and D3 may be approximately 4.5 mm. In any case, providing a longitudinal gap above a bump may ensure that the bump does not generate frictions with another surface of the grinder and create resistance forces that require a user to exert a large amount of force when grinding a plant substance. Instead, the bumps encourage rolling friction between the plant substance and the bumps so that the plant substance is ground into pieces small enough to pass through the holes 146 in the bottom grinding section 130.

However, to be clear, the embodiment depicted in FIGS. 7 and 8 is only an example and is not intended to be limiting. For example, in different embodiments, surfaces 120 and 140 need not be flat and could still incorporate bumps with longitudinal gaps disposed there above. That is, surface 120 and surface 140 could each be concave, convex, or irregularly shaped and still implement the concepts presented herein. Likewise, bumps 122 and/or bumps 142 need not be hemispherical and may be rounded in any manner. Still further, the apexes of bumps 122 and 142, as well as the surfaces 120 and 140 of grinding sections 110 and 130 may be spaced apart by any amount of space and such space may vary across a single embodiment (e.g., by varying sizes or shapes of bumps and/or by providing a non-flat (e.g., undulating or convex) surface).

More generally, while the grinder presented herein has been illustrated and described in detail and with reference to specific embodiments thereof, it is nevertheless not intended to be limited to the details shown, since it will be apparent that various modifications and structural changes may be made therein without departing from the scope the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the grinder of the present invention, or portions thereof, may be fabricated from any suitable material or combination of materials, provided that the device, or portions thereof, can function as described herein (e.g., to form sealed connections). Example materials include plastic, foamed plastic, wood, cardboard, pressed paper, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Additionally, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Finally, when used herein, the term "comprises" and its derivatives (such as "comprising", etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate," etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially."

What is claimed is:

1. A grinder for plant substances comprises:
    a first grinding section comprising a first surface, a first sidewall extending from the first surface, and a shoulder extending radially outward and circumferentially around the first sidewall; and
    a second grinding section comprising an opposing second surface and a second sidewall extending from the second surface, the shoulder of the first grinding section and an edge of the second sidewall of the second grinding section being configured to abut one another to form a first longitudinal gap that separates the first surface and the second surface from one another so that the first surface and the second surface define a receptacle within which a plant substance may be received, the second surface including holes through which ground pieces of the plant substance may pass,
    wherein at least one of the first surface and the second surface includes bumps that extend into, but not across, the receptacle defined by abutment of the shoulder of the first grinding section and the edge of the second sidewall of the second grinding section against one another, the bumps encouraging rolling friction between the plant substance and the bumps so that the plant substance is ground into pieces small enough to pass through the holes.

2. The grinder of claim 1, wherein the bumps are hemispherical knobs.

3. The grinder of claim 1, wherein the bumps are patterned between the holes.

4. The grinder of claim 1, wherein the bumps are patterned symmetrically around or across the at least one of the first surface and the second surface.

5. The grinder of claim 1, wherein the bumps are patterned linearly across the at least one of the first surface and the second surface.

6. The grinder of claim 1, wherein the bumps are first bumps included on the first surface and the grinder further comprises second bumps included on the second surface.

7. The grinder of claim 6 wherein the first bumps and the second bumps are hemispherical knobs.

8. The grinder of claim 6, wherein apexes of the second bumps are separated from apexes of the first bumps by a second longitudinal gap that is smaller than the first longitudinal gap.

9. The grinder of claim 8, wherein the second longitudinal gap spans a second longitudinal distance that is equal to or less than approximately 50% of a first longitudinal distance of the first longitudinal gap.

10. The grinder of claim 9, wherein the second longitudinal distance is at least approximately 3 mm.

11. The grinder of claim 1, wherein the first grinding section is removably coupleable to the second grinding section.

12. The grinder of claim 11, further comprising one or more sieves positioned to receive the pieces of the plant substance that are small enough to pass through the holes and to further filter the plant substance based on size.

13. The grinder of claim 12, further comprising a catcher positioned to receive portions of the plant substance that pass through the one or more sieves.

14. A grinder for plant substances comprises:
a top grinding section comprising a first sidewall and a shoulder extending radially outward and circumferentially around the first sidewall;
a catcher; and
a bottom grinding section that is removably coupleable to the top grinding section and removably coupleable to the catcher to position the bottom grinding section between the top grinding section and the catcher, wherein the bottom grinding section comprises a second sidewall with an edge, and the edge is configured to engage the shoulder of the top grinding section to couple the bottom grinding section and the top grinding section to one another and to define a receptacle extending between the top grinding section and the bottom grinding section and configured to receive a plant substance, wherein:
at least one of the top grinding section and the bottom grinding section includes bumps that extend into, but not across, the receptacle defined by engagement of the shoulder of the top grinding section and the edge of the second sidewall of the bottom grinding section with one another, the bumps encouraging rolling friction between the plant substance and the bumps so that the plant substance is ground into pieces; and
the bottom grinding section includes holes through which the pieces of the plant substance may pass to the catcher.

15. The grinder of claim 14, wherein the bumps are hemispherical knobs.

16. The grinder of claim 14, wherein the bumps are patterned between the holes in a pattern that is linear across, symmetrical around, and/or symmetrical across the at least one of the top grinding section and the bottom grinding section.

17. The grinder of claim 14, wherein the bumps are first bumps included on the bottom grinding section and the grinder further comprises second bumps included on the top grinding section.

18. The grinder of claim 17, wherein the receptacle has a first longitudinal dimension and apexes of the second bumps are separated from apexes of the first bumps by a second longitudinal dimension that is smaller than the first longitudinal dimension.

19. The grinder of claim 18, wherein the second longitudinal dimension is less than or equal to approximately 50% of the first longitudinal dimension.

20. The grinder of claim 14, further comprising one or more sieves positioned between the bottom grinding section and the catcher and configured to filter the plant substance based on size.

* * * * *